United States Patent [19]

Madison

[11] Patent Number: 5,154,124
[45] Date of Patent: Oct. 13, 1992

[54] RAIL ENGAGEMENT APPARATUS WHICH USES VEHICLE SUPENSION

[75] Inventor: Harry Madison, Germantown, Tenn.

[73] Assignee: Harsco Corporation, Wormleysburg, Pa.

[21] Appl. No.: 755,115

[22] Filed: Sep. 5, 1991

[51] Int. Cl.⁵ ............................................ B61D 15/00
[52] U.S. Cl. ..................................................... 105/72.2
[58] Field of Search .......................... 105/72.2, 215.2; 280/704, 414.5; 180/209

[56] References Cited

U.S. PATENT DOCUMENTS

| | | | |
|---|---|---|---|
| 2,655,873 | 10/1953 | McDonal | 105/215.2 |
| 3,738,285 | 6/1973 | Olson et al. | 105/72.2 |
| 3,980,025 | 9/1976 | Olson et al. | 105/72.2 |
| 4,266,483 | 5/1981 | Rannanmaki | 105/72.2 |
| 4,488,494 | 12/1984 | Powell, Sr. | 105/215.2 |
| 4,537,137 | 8/1985 | White | 105/72.2 |
| 4,583,465 | 4/1986 | Powell, Sr. | 105/215.2 |
| 5,018,453 | 5/1991 | Kinard | 105/72.2 |

Primary Examiner—Robert J. Oberleitner
Assistant Examiner—Mark T. Le
Attorney, Agent, or Firm—Kerkam, Stowell, Kondracki & Clarke

[57] ABSTRACT

A rail engagement apparatus to allow a highway or road vehicle to travel along a railway includes a wheel support having railway wheels. When the rail support is in a lower position corresponding to a rail mode, the wheel support bears against the underside of the vehicle axle. Vibration and shock from contact between the railway wheel and rails will therefore be dampened by the vehicle suspension. The wheel support may be disposed in an upper position corresponding to a road mode such that there is no contact between the wheel support and the vehicle axle.

20 Claims, 7 Drawing Sheets

FIG. 1

FIG_6

RAIL ENGAGEMENT APPARATUS WHICH USES VEHICLE SUPENSION

BACKGROUND OF THE INVENTION

This invention relates to a rail engagement apparatus for a road vehicle. More specifically, this invention relates to a rail engagement apparatus mountable upon a road vehicle to allow use of a vehicle suspension when the road vehicle is driven along a railway.

Railroad service crews often have to go to various places along a railroad track in order to make repairs and inspections. Depending upon the type of service which is to be performed and other factors, the service crew may ride to the work site using a rail vehicle or using a road vehicle, such as a truck or car. Since the best way to a work site may include travel along a road and travel along a railway, service crews and other rail workers often have used road vehicles having a rail engagement apparatus mounted on them. Such cars or trucks may travel along a highway or other road with road wheels engaging the road. Upon getting to an appropriate place along the railway, the rail engagement apparatus is operated such that railway wheels are lowered from the vehicle until the vehicle is bound to the railway. Usually such vehicles include an apparatus at the front of the vehicle which lifts the front road wheels off the ground when two front railway wheels engage rails and an apparatus at the back of the vehicle, which apparatus secures the back of the vehicle to the rails by two back railway wheels. The two back railway wheels usually allow the regular road wheels to contact the rails or other surface such that the road wheels may provide traction to move the vehicle even when the two front railway wheels and two back railway wheels have secured the vehicle to the rail. When the vehicle wishes to leave the railway, the two front railway wheels and the two rear railway wheels are retracted or lifted up such that the vehicle may again run along the road.

Various structures have been used to allow railway wheels to be attached to road vehicles. Although such structures have been generally useful at moving the railway wheels between an upper position in which the vehicle may travel along a highway or other road and a lower position in which the vehicle would travel along a railway, such structures have often been subject to one or more of several disadvantages. Such structures are often quite heavy. One of the reasons that these structures are often quite heavy is that they often include a shock absorption system to absorb shocks when the railway wheels are engaged with rails.

Prior U.S. Pat. No. 4,488,494 issued Dec. 18, 1984 to Powell discloses a rail engagement apparatus for a road vehicle wherein the rail engagement apparatus uses the shock absorption arrangement already in the vehicle suspension for absorbing shocks when the railway wheels are engaged. Thus, one need not use a separate system in the rail engagement apparatus for absorbing vibration. However, the rail engagement apparatus of Powell is attached to the vehicle suspension and will increase the undesirable unsprung weight of the vehicle. (The unsprung weight is the weight of those parts of the vehicle which receive vibrations from the vehicle contact with the rolling service without the vibrations being dampened by the shock absorption arrangement vehicle suspension.) This unsprung weight increase changes the handling characteristics of the vehicle even for road operations.

Various other structures which have been used to allow road vehicles to travel along railways have often had reliability or maintenance problems, high cost due to complex construction, and instability in operation.

OBJECTS AND SUMMARY OF THE INVENTION

Accordingly, it is a primary object of the present invention to provide a new and improved rail engagement apparatus for a road vehicle.

A more specific object of the present invention is to provide a rail engagement apparatus which does not significantly change the unsprung weight of the vehicle when the vehicle is used for road operations.

Yet another object of the present invention is to provide a rail engagement apparatus with no or minimal changes in the handling characteristics of the vehicle when the vehicle is used for road operations.

A still further object of the present invention is to provide a rail engagement apparatus which is relatively simply in construction, reliable in operation, low in cost.

The above and other objects of the present invention which will become more apparent are realized by a rail engagement apparatus for a road vehicle, which road vehicle has a vehicle axle with road wheels and a vehicle suspension. A mount frame is adapted to be mounted to the road vehicle. A wheel support has a first railway wheel rotatably mounted on it, the wheel support movably connected to the mount frame. An actuator is connected to the wheel support and is operable to move the wheel support relative to the mount frame between: a lower position in which the first railway wheel extends lower than the road wheels to engage a rail with the wheel support transferring load to the vehicle suspension by way of a first contact point of the wheel support against the vehicle such that the vehicle suspension absorbs shocks, and an upper position wherein the first railway wheel is completely above a lowest point of the road wheels and the first contact point of the wheel support is withdrawn from contact with the vehicle. The first actuator is operable to move the wheel support such that the first contact point is underneath and against the vehicle axis. Bearing means is disposed at the first contact point of the wheel support for bearing between the wheel support and the vehicle axis.

The wheel support further has a second railway wheel mounted thereon. The second railway wheel extends lower than the road wheels when the wheel support is in the lower position and the second railway wheel is completely above a lowest point of the road wheels when the wheel support is in its upper position. The wheel support includes a railway axle extending between the first railway wheel and the second railway wheel. The wheel support includes first and second wheel arms adjacent opposite ends of the railway axle and the first contact point is adjacent a wheel end of the first wheel arm. The second wheel arm transfer load to the vehicle suspension by way of a second contact point adjacent a wheel end of the second wheel arm which contacts the vehicle when the wheel support is in its lower position. The second contact point is withdrawn from contact with the vehicle when the wheel support is in its upper position. The actuator moves the wheel support in a vehicle lengthwise direction when moving the wheel support between its lower position and its upper position.

The apparatus further includes an actuating arm pivotably mounted at one end to the mount frame and pivotably connected at another end to the wheel support. The actuator causes the actuating arm to pivot such that the actuating arm moves the wheel support between the lower position and the upper position. The apparatus further includes a cross-member, a cross-member arm, a first link, and a second link. The first link has one end pivotably connected to the mount frame and another end pivotably connected to the second link. The second link is further pivotably connected to the cross-member arm. The cross-member is rotatably connected to the mount frame and the actuating arm and the cross-member arm are fixed to the cross-member and pivotable relative to the mount frame by rotation of the cross-member. The actuator is operable to move the wheel support by moving the first and second links such that the second link moves the actuating arm by way of the cross-member arm and the cross-member. A flexible link has a first end attached to the wheel support and a second end attached to the vehicle. The flexible link is operable to prevent the wheel support from catching on lower obstructions. Each of the first and second wheel arms has two parts with a bend therebetween. When the wheel support is in its upper position, the apparatus is completely sprung weight relative to the vehicle suspension.

The mount frame is adapted to be mounted to the front of the road vehicle.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
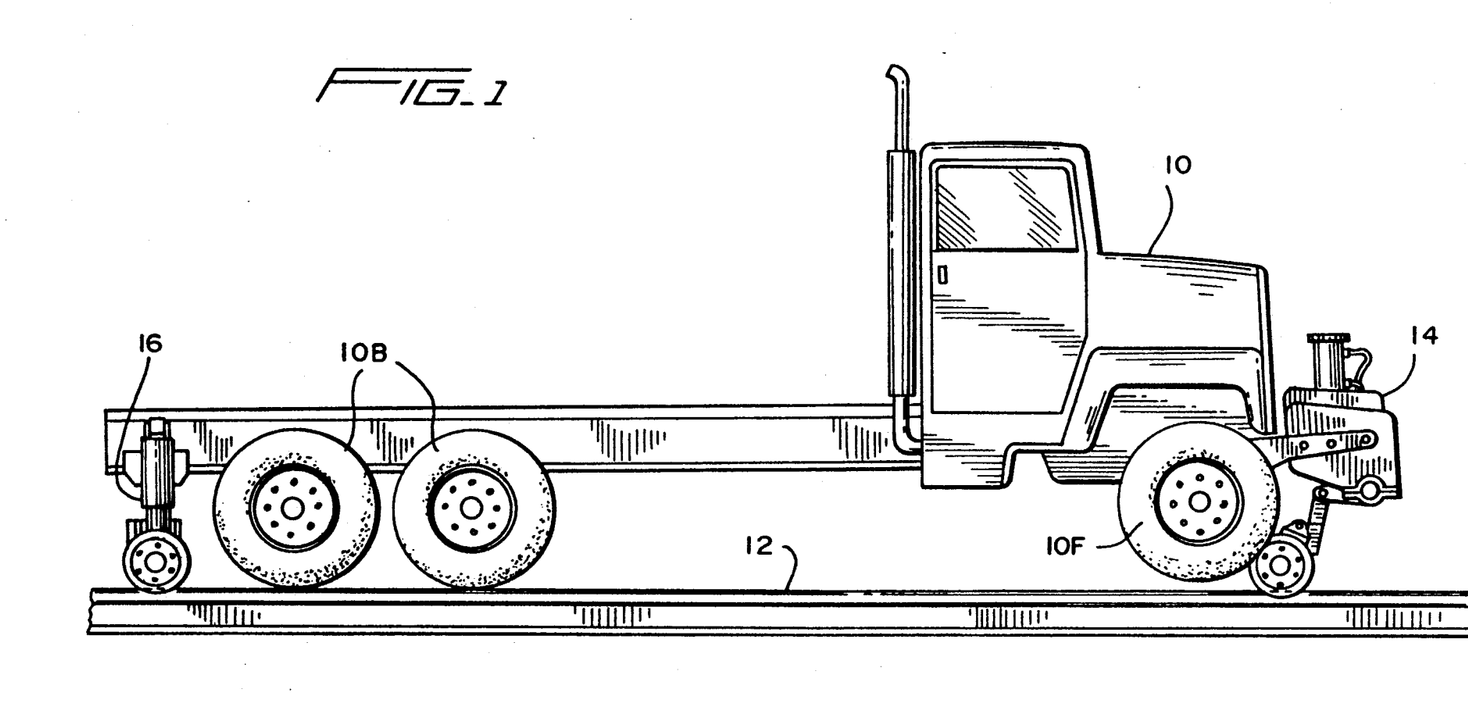
FIG. 1 is a simplified side view of a road vehicle having the present invention mounted at its front.

As shown in FIG. 1, a generally standard road vehicle, truck 10, has been modified to move along rails 12 (only one visible). In particular, the apparatus 14 according to the present invention has been mounted at the front of the truck 10. The apparatus 14 is used to lift the front wheels 10F (only one visible in FIG. 1) such that the truck 10 may travel along the rails. A rail engagement apparatus 16 is mounted at the back of truck 10. The rail engagement apparatus 16 allows the back of truck 10 to be secured to the rails 12, while allowing wheels 10B to engage the top of rails 12 and propel the vehicle 10. Various rail engagement arrangements could be used for the apparatus 16, but they need not be discussed in detail as they are not part of the present invention.

Figure 2:
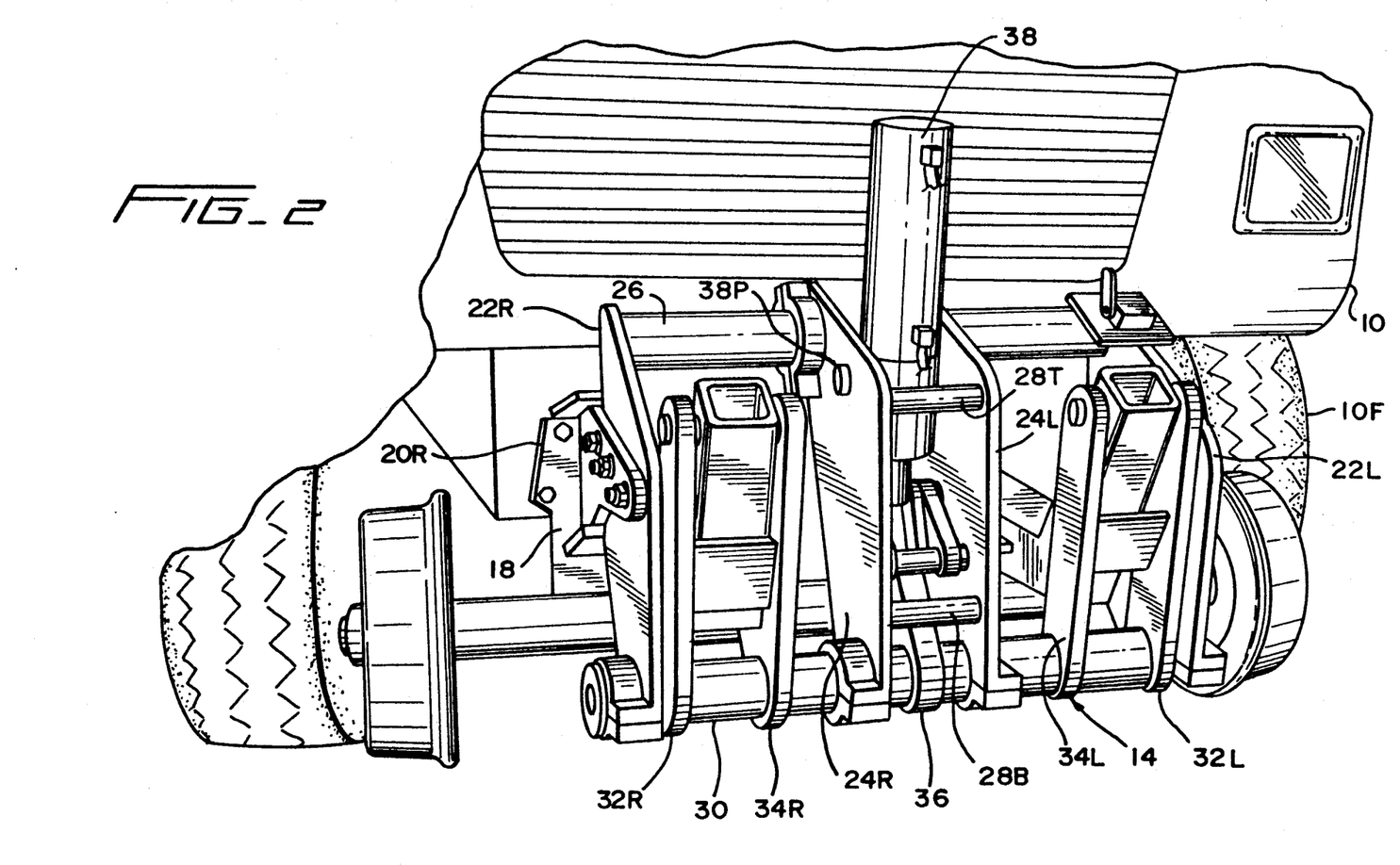
FIG. 2 is a prospective view showing the present invention mounted to the front end of a truck.
Figure 3:
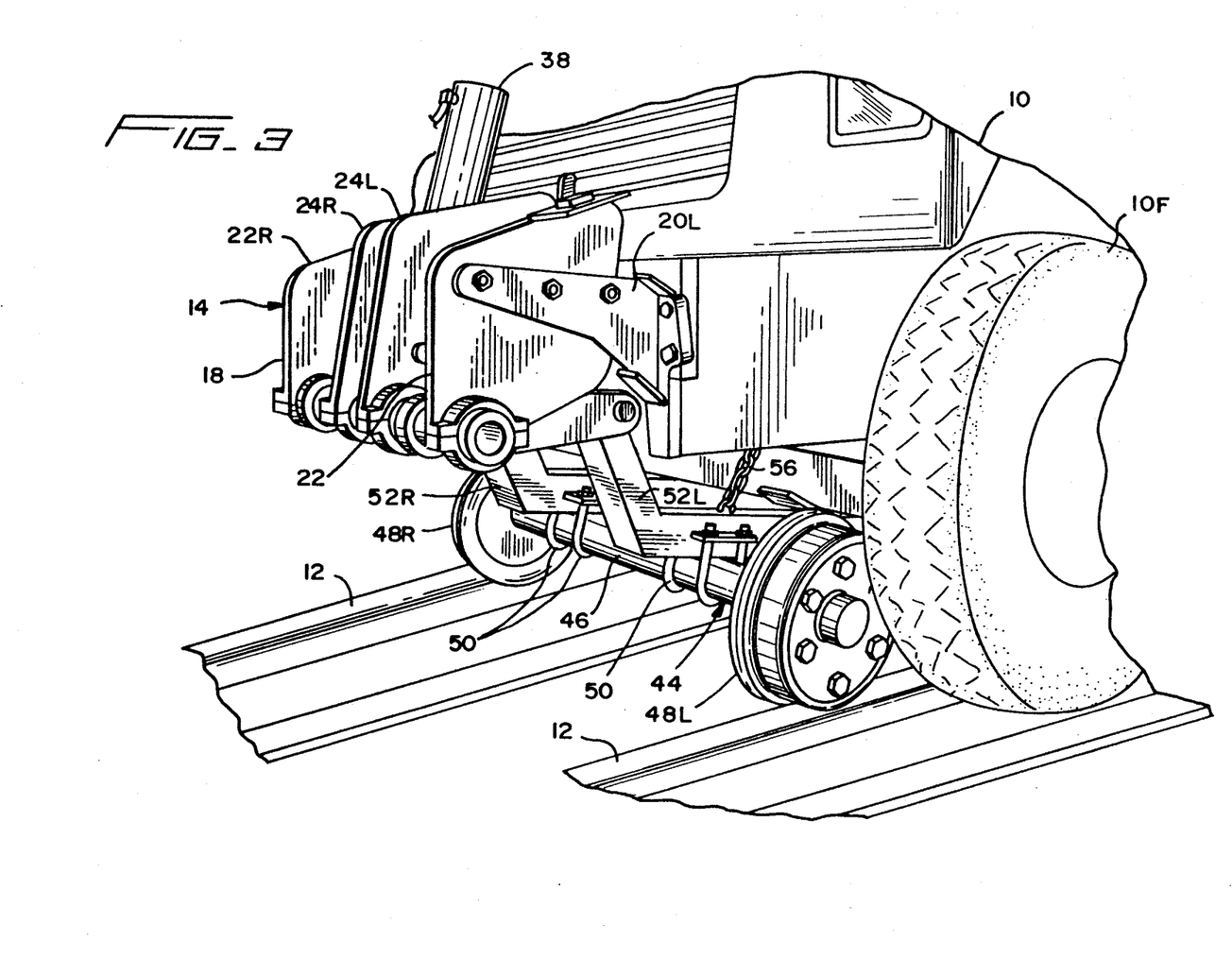
FIG. 3 is a further prospective view of the apparatus and truck of FIG. 2.

Turning now to FIGS. 2 and 3, the rail engagement apparatus 14 is shown respectively in a road mode for operation along a road and moving towards a rail mode for operation along rails 12 (rails 12 in FIG. 3 only). The apparatus 14 includes a mount frame 18 which may be bolted and/or welded to the frame of vehicle 10. Specifically, the mount frame 18 includes right anchor piece 20F (FIG. 2 only) and left anchor piece 20L (FIG. 3 only). As the apparatus 14 is essentially symmetric about a vehicle lengthwise direction (i.e., front to back direction at the center of vehicle 10), it will be appreciated that numerous of the parts of apparatus 14 have identical right and left components such as 20R and 20L.

The mount frame 18 further includes outer plates 22L and 22R bolted and/or welded to corresponding anchor pieces 20R and 20L, inner plates 24R and 24L, and brace 26 secured to the plates. Top and bottom braces 28T and 28B secure the two inner plates 24L and 24R together such that the various components of support frame 14 are fixed relative to each other and are fixed to the vehicle 10. Significantly, the support frame 14 is fixed to the vehicle frame such that the apparatus 14 will be sprung weight relative to the vehicle suspension. In other words, when the apparatus 14 is in its road mode, any vibrations from contact between the road wheels 10F and the ground must pass through the vehicle suspension and associated shock absorption arrangement before reaching the apparatus 14.

Continuing to view FIGS. 2 and 3, but also considering the side view with parts in cross-section of FIG. 4 with the apparatus 14 in its road position, various mechanisms mounted to the support frame 14 will be discussed. A cross-member tube 30 is rotatably mounted to the plates 22R, 22L, 24R, and 24L. Fixed to the tube 30 are right and left outer actuating arms 32R and 32L and right and left inner actuating arms 34R and 34L. Also fixed to the tube 30 is a cross-member arm 36.

A double-acting hydraulic cylinder 38 is pivotably mounted between inner plates 24R and 24L at 38P.

Figure 4:
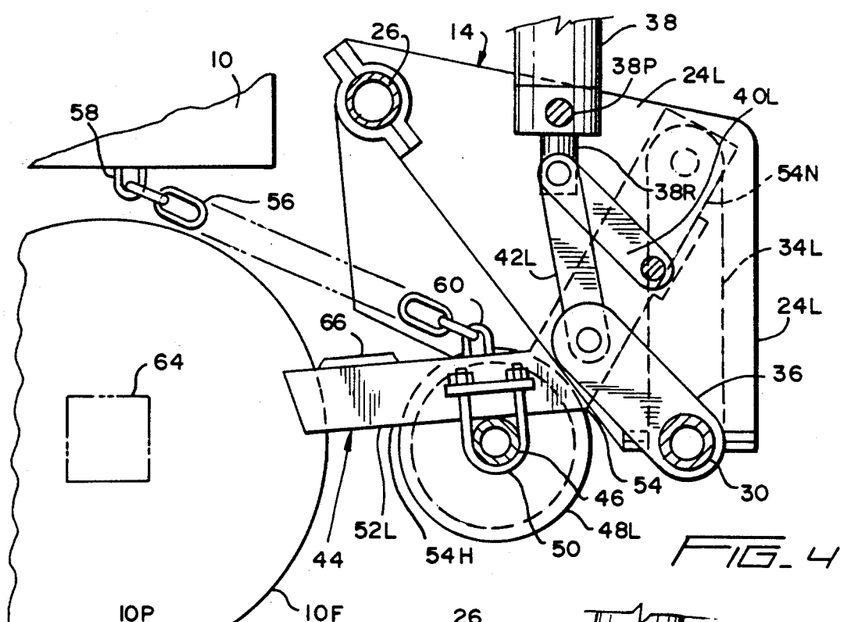
FIG. 4 is a simplified side view showing the present invention in a retracted position.

As is best shown in FIG. 4, the rod 38R of cylinder 38 is pivotably connected to first and second links 40L and 42L respectively. Although not shown, corresponding and symmetrical right-side first and second links would also be pivotably connected to the rod 38R. The link 42L (and its corresponding unshown right-side link) is pivotably connected to the cross-frame arm 36.

Continuing to view FIG. 4, but also referring to FIGS. 2 and 3, the structure of a wheel support 44 will be discussed. The wheel support 44 includes an axle 46 having right and left wheels 48R and 48L rotatably mounted at opposite ends. Fixed to the axle 46 by U-shaped brackets 50 are right and left wheel arms 52R and 52L. Each of the wheel arms is pivotably mounted between corresponding pairs of the actuating arms 32R, 32L, 34R, and 34L at an upper end. Each of the arms 52R and 52L includes a bend 54 separating a normally horizontal portion 54H (see FIG. 4 only) from an inclined portion 54N.

As shown in FIG. 4, a flexible link such as chain 56 is attached between loop 58 secured to the frame of the vehicle 10 and loop 60 secured to the wheel arm 52L. (A similar chain, not shown, would be used for the right wheel arm.) The chain 56 prevents the wheel arm 52L from catching on any obstructions on the ground.

As clearly shown in FIG. 4, the railway wheel 48L is completely between (i.e., no parts of its extend outside of) the actuating arm 34L and the vehicle suspension 64. As more specifically shown, the wheel is completely between the suspension 64 and the pivot axis about which the wheel support 44 rotates, that pivot axis being at the joint between wheel support 52L and actuating arm 34L.

Considering now FIG. 4 in conjunction with FIGS. 5 and 6, the steps by which the apparatus 14 is changed from its road mode of FIG. 4 to its railway mode of FIG. 6 will be discussed. In the road mode of FIG. 4, the wheel support 44 is in an upper position with railway wheel 48L disposed completely above a lowest point 10P of wheel 10F. From the position of FIG. 4, the hydraulic cylinder 38, which serves as an actuator, starts to extend its rod 38R. The links 40L and 42L are moved from their position in FIG. 4 to their position in FIG. 5. Movement of link 42L moves the cross-member arm 36 by way of the pivotable connection between it and link 42L. This causes rotation of the cross-member or tube 30, which in turn moves the actuating arm 34L from its vertical position in FIG. 4 to the inclined position of FIG. 5. Referring back momentarily to FIG. 2, it will be appreciated that arms 32R, 34R, and 32L will be moving in unison with arm 34L. Likewise, unshown right side links corresponding to links 40L and 42L will be moving in unison with the respective corresponding left side link.

Figure 5:
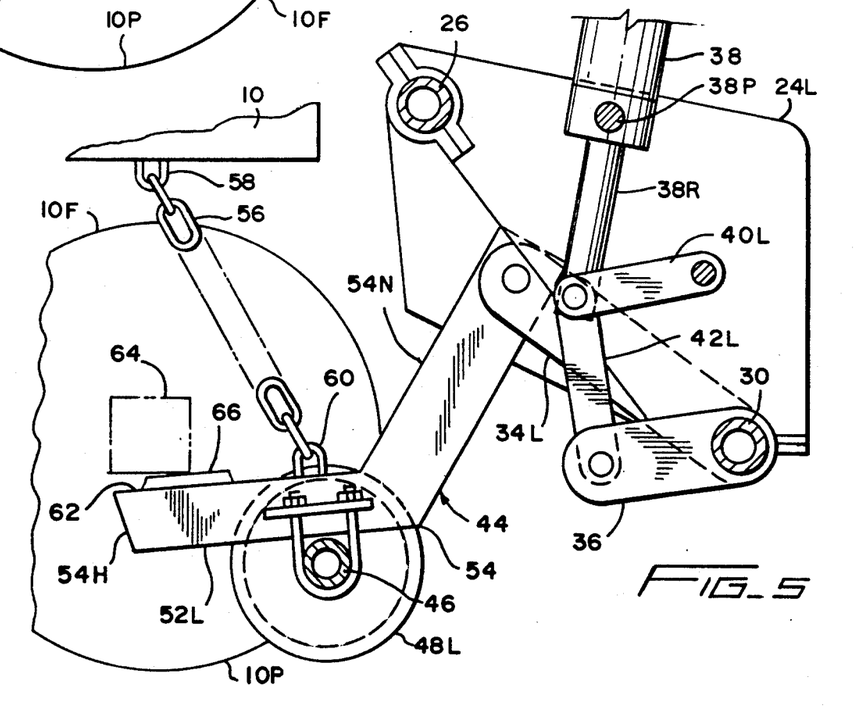
FIG. 5 is a side view like FIG. 4 except that the apparatus has moved from its retracted upper position of FIG. 4 towards a lower position.

As the actuating arms such as actuating arm 34L move from the vertical position of FIG. 4 to the inclined position of FIG. 5, the wheel support 44 is moved down and backward until it reaches the position of FIG. 5 with the bottom of the wheel 48L in line with the lowest point 10P of road wheel 10F. The flexible link or chain 56 limits the possible orientation positions of wheel support 44 as it moves from FIG. 4 to FIG. 5 so that the end of wheel arm 52L will not catch on anything on the ground.

As the rod 38R extends further from its position in FIG. 5, the actuating arm 34L pivots further downward as the cross-member 30 rotates further. The wheel 48L may roll along the rail (not in FIG. 5, see FIG. 6) as a contact area 62 slides under the vehicle front axle 64 (shown in simplified form). As this process continues, the wheel support 44 reorients itself so that part 54H of wheel arm 52L becomes essentially horizontal in the position of FIG. 6. As this occurs, the truck axle 64 is lifted such that the front tires 10F of the truck are lifted off the ground and the rail wheel 48L engages the rail 12. A polymer plastic wear pad 66 having tapered edges may be mounted on the top of part 52L for minimizing wear and for bearing the sliding contact as support arm 52L moves from its FIG. 5 position to its FIG. 6 position.

Figure 6:
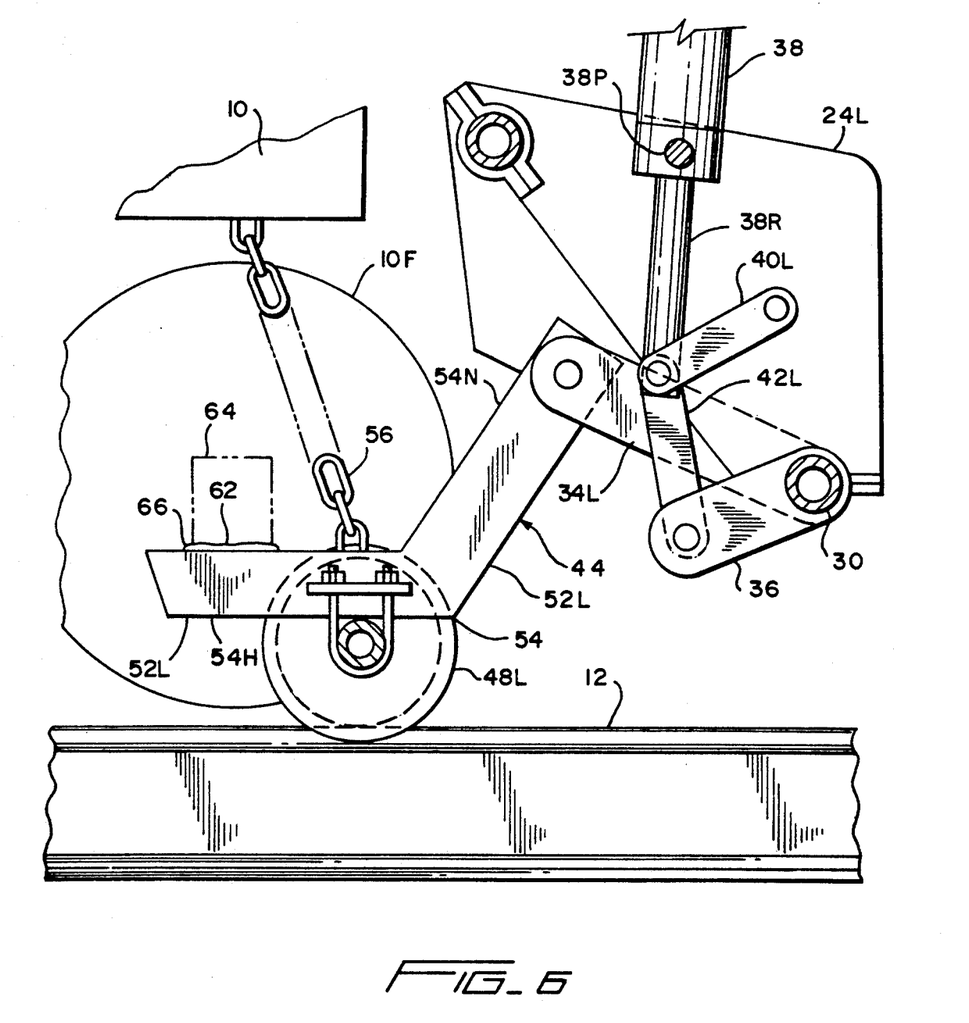
FIG. 6 shows a side view similar to FIGS. 4 and 5 except that the apparatus is now in its lower or rail engagement position.

With the wheel 48L in the position of FIG. 6, any vibrations or shocks from contact between the wheel 48L and the rail 12 will be dampened by operation of the vehicle suspension system corresponding to axle 64. Thus, in the position of FIG. 6, one may use the vehicle suspension and one need not have shock absorption features on the apparatus 14. However, when the vehicle is ready to run along a highway, the cylinder 38 may be actuated again to retract the wheel support 44 from the position of FIG. 6 back to the position of FIG. 4. With the wheel support 44 in its upper position of FIG. 4 corresponding to the apparatus 14 in its road mode, the apparatus 14 is all sprung weight (i.e., it is not unsprung weight as previously defined) and would therefore have minimal effect on the road characteristics of the vehicle.

Figure 7:
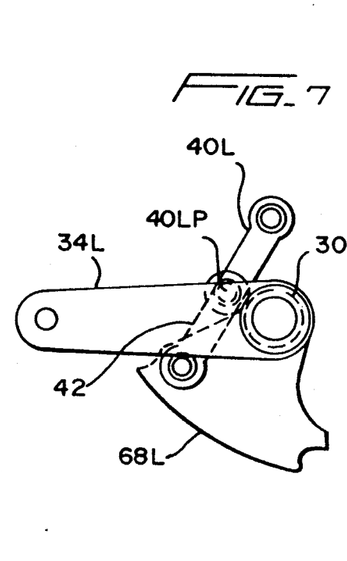
FIG. 7 shows a simplified side view illustrating an over center position of a linkage.

Various arrangements may be used to secure the apparatus 14 in its different modes. A simplified side view of one such arrangement is shown in FIG. 7. In the arrangement of FIG. 7, the links 40L and 42L assume the illustrated over center position when the apparatus 14 is disposed in its railway mode. In other words, instead of the links 40L and 42L being situated as shown in FIG. 6 when the rail wheel 48L is engaged to the rail 12, the hydraulic cylinder 38 (not shown in FIG. 7) would cause the links 40L and 42L to assume the illustrated over center position. Any unusual circumstances which might otherwise tend to collapse the wheel support 44 from its FIG. 6 position to the FIG. 4 position would be greatly resisted because the pivot connection 40LP between 40L and 42L would tend to be driven against the cross-member 30. Thus, the railway mode for the apparatus 14 will be very stable. FIG. 7 also shows a cam 68L which may be used to lock the apparatus 14 in both its road mode (wheel support 44 up) and its railway mode (wheel support 44 down).

Figures 8, 10:
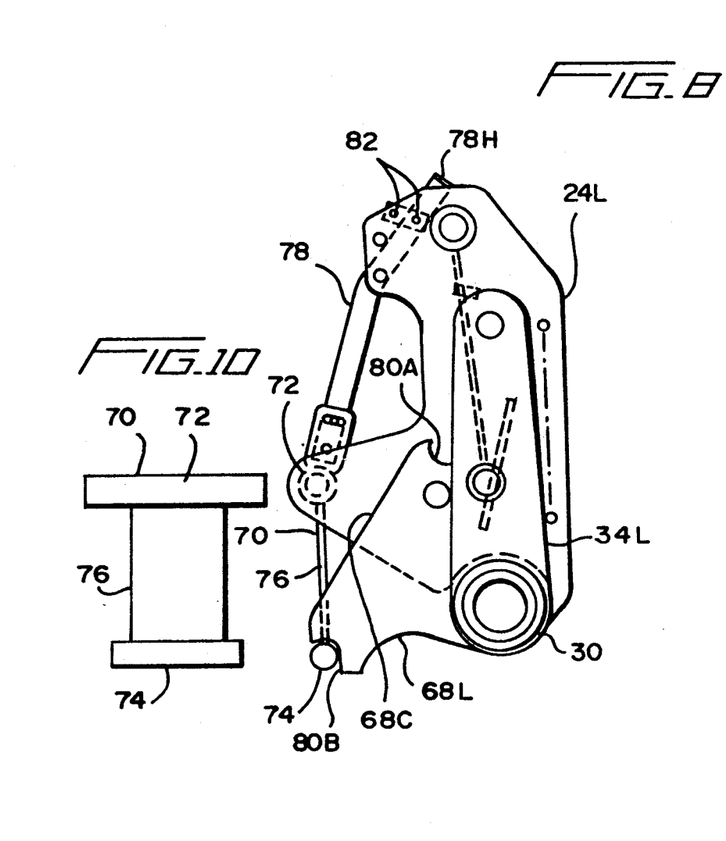
FIG. 8 shows a simplified side view of a cam locking arrangement.
FIG. 10 shows a front view of a locking member.
Figure 9:
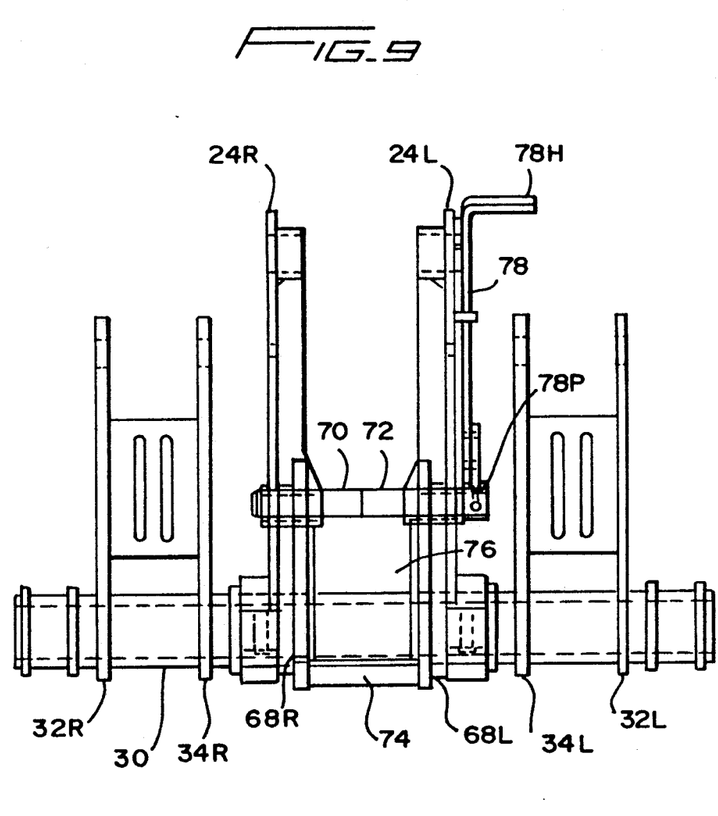
FIG. 9 shows a simplified front view of the arrangement of FIG. 8 and associated parts.

Referring now to FIGS. 8 and 9, identical right and left cams 68R and 68L are fixed to the cross-member 30 such that they rotate with it. A lock member 70 has an upper rod 72 fixed to a lower rod 74 by a plate 76, these components best shown in FIG. 10. The upper rod 72 is longer than the lower rod 74 and allows the lock member 70 to be rotatably mounted to the inner plates 24R and 24L (see especially FIG. 9).

In the position of FIG. 8, the cam 68L is locked in an upper position corresponding to the road mode of FIG. 4. Note that the actuation arm 34L is disposed vertically. Since the cam 68L (as well as identical cam 68R) is locked, this locks the cross-member 30 against rotation such that the actuation arm 34L is locked against pivoting. The wheel support 44 (not shown in FIG. 8) would be locked in its upper position.

When one wants to change from the mode for highway travel to the mode for railway travel, one uses a lock lever 78 (FIGS. 8 and 9) fixed at point 78P to the rod 72. With reference to FIG. 8, pulling the lock lever 78 by its handle 78H in a rightward direction (i.e., rightward as seen in FIG. 8) will rotate member 70 about pin 72 such that lower pin 74 will clear notch 80B of cam 68L. The opposite end of pin 74 would also clear the cam 68R. One may then use the actuator or hydraulic cylinder 38 (not shown in FIGS. 8 and 9) to move the apparatus 14 into its railway mode. After a short delay, one may release the lever 78 and the pin 74 will simply slide along the caming surface 68C of cam 68L. The cam 68L will be moving in a counterclockwise direction relative to the view of FIG. 8 as the actuating arm 34L moves from its position of FIG. 8 to the position shown for it in FIG. 6. At the end of its travel, when the apparatus is in the railway mode, the pin 74 locks the cam 68L by becoming disposed within a notch 80A. The lock lever 78 may be used to free the pin 74 from either notch 80A or notch 80B. Note that quick release pins 82 may be used to secure the lock lever 78 in its proper position. The lock lever 78 may be locked in different positions depending on whether the pin 74 is in notch 80A or notch 80B.

Figure 11:
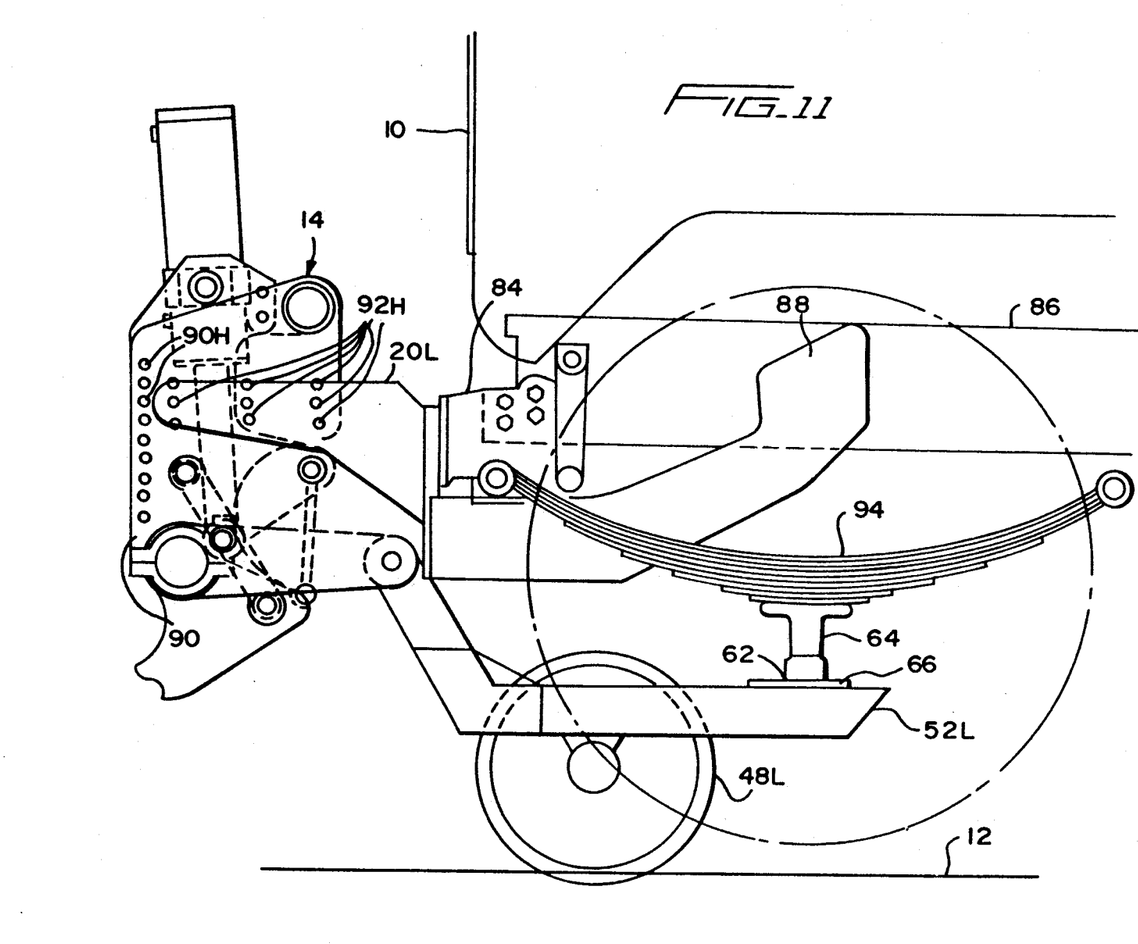
FIG. 11 shows a simplified side view of the present invention as mounted to a vehicle frame.

Turning now to FIG. 11, a more complete view of one of the mounting brackets and several other features of the present invention will be discussed. The mount bracket 20L may be bolted on the bracket 84, which bracket is a standard bracket mounted to the frame 86 of the truck 10 and normally used to mount a bumper on the vehicle. In order to install the present apparatus 14, the bumper of teh truck would be removed and the mount bracket 20L would be secured to bracket 84. Note that the bracket 20L includes a portion extending back to 88, which portion would be welded and/or bolted to the side of the vehicle frame 86. A bumper 90 may be mounted at the front of the apparatus 14 by securing two or more of its holes 90H to a bumper mounting bracket (not shown in FIG. 11, but such a bracket may simply be attached to one or more of the plates such as 22R or 24R of FIG. 2). The numerous holes 90H allow the bumper 90 to be mounted in various positions depending upon the particular model of truck 10 to which the apparatus 14 is attached. Likewise, a series of holes 92H may allow the outer plates 22R and 22L (refer back to FIG. 2) to be mounted at different locations relative to the bracket 20L depending upon the model of truck 10.

As shown in FIG. 11, the contact point or zone 62 between the wheel arm 52L and axle 64 may include the bearing or wear pad 66. As shown in FIGS. 5, 6, and 11, the contact point or zone 62 is fixed (i.e., not movable) relative to the wheel support arm 52L on which it is mounted. A similar contact point would be on the unshown right side wheel arm. Above the truck axle 64 is the leaf spring arrangement 94, which serves to absorb shocks and vibrations from the contact between the rail wheel 48L and the rail 12.

Although various specific constructions have been presented herein, it is to be understood that these are for illustrative purposes only. Various modification and adaptations will be apparent to those of skill in the art. Accordingly, the scope of the present invention should be determined by reference to the claims appended hereto.

What is claimed is:

1. A rail engagement apparatus for a road vehicle having a vehicle axle with road wheels and a vehicle suspension comprising:
   a mount frame adapted to be mounted to the road vehicle; a wheel support having a first railway wheel rotatable mounted thereon, said wheel support movably connected to said mount frame; and
   an actuator connected to said wheel support and operable to move said wheel support relative to said mount frame between:
   I. a lower position in which said first railway wheel extends lower than the road wheels to engage a rail with said wheel support transferring load to the vehicle suspension by way of a first contact point of said wheel support against the vehicle such that the vehicle suspension absorbs shocks; and
   II. an upper position wherein said first railway wheel is completely above a lowest point of the road wheels and said first contact point of said wheel support is withdrawn from contact with the vehicle, and
   wherein said wheel support further includes a first wheel arm supporting said first railway wheel, said first wheel arm pivotable between lower and upper positions corresponding respectively to lower and upper positions of said wheel support, and said first contact point is fixed on said first wheel arm.

2. The apparatus of claim 1 wherein said actuator is operable to move said wheel support such that said first contact point is underneath and touching the vehicle axle.

3. The apparatus of claim 2 further comprising bearing means at said first contact point of said wheel support for bearing between said wheel support and the vehicle axle.

4. The apparatus of claim 1 wherein said wheel support has a second railway wheel mounted thereon and wherein said second railway wheel extends lower than the road wheels when said wheel support is in said lower position and said second railway wheel is completely above a lowest point of the road wheels when said wheel support in said upper position.

5. The apparatus of claim 4 wherein said wheel support includes a railway axle extending between said first railway wheel and said second railway wheel.

6. The apparatus of claim 5 wherein said wheel support includes a second wheel arm supporting said second railway wheel by way of said axle, said first and second wheel arms adjacent opposite ends of said railway axle and said first contact point is adjacent a wheel end of said first wheel arm, and said second wheel arm transfers load to the vehicle suspension by way of a second contact point fixed on said second wheel arm, said second contact point contacting said vehicle when said wheel support is in said lower position and said second contact point is withdrawn from contact with the vehicle when said wheel support is in said upper position.

7. The apparatus of claim 6 wherein said actuator moves said wheel support in a vehicle lengthwise direction when moving said wheel support between said lower position and said upper position.

8. The apparatus of claim 7 further comprising an actuating arm pivotably connected at one end to said mount frame and pivotably connected at another end to said wheel support and wherein said actuator causes said actuating arm to pivot such that said actuating arm moves said wheel support between said lower position and said upper position.

9. The apparatus of claim 8 wherein each of said first and second wheel arms has two parts with a bend therebetween.

10. The apparatus of claim 8 wherein said apparatus with said wheel support in its upper position is completely sprung weight relative to the vehicle suspension.

11. The apparatus of claim 1 wherein said actuator moves said wheel support in a vehicle lengthwise direction when moving said wheel support between said lower position and said upper position.

12. The apparatus of claim 1 further comprising an actuating arm pivotably connected at one end to said mount frame and pivotably connected at another end to said wheel support and wherein said actuator causes said actuating arm to pivot such that said actuating arm moves said wheel support between said lower position and said upper position, and wherein, when said wheel support is in its upper position, said first railway wheel is completely between said actuating arm and the vehicle suspension.

13. The apparatus of claim 1 wherein said first contact point is adjacent a wheel end of said first wheel arm.

14. The apparatus of claim 1 further comprising an actuating arm having a lower end pivotably connected to said mount frame and an upper end pivotably connected to said first wheel arm, wherein said first wheel arm pivots relative to said mount frame about a pivot axis extending through said upper end of said actuating arm, and when said wheel support is in its upper position, said first railway wheel is completely between the vehicle suspension and said pivot axis.

15. A rail engagement apparatus for a road vehicle having a vehicle axle with road wheels and a vehicle suspension comprising:
a mount frame adapted to be mounted to the road vehicle; a wheel support having a first railway wheel rotatable mounted thereon, said wheel support movably connected to said mount frame; and
an actuator connected to said wheel support and operable to move said wheel support relative to said mount frame between:
  I. a lower position in which said first railway wheel extends lower than the road wheels to engage a rail with said wheel support transferring load to the vehicle suspension by way of a first contact point of said wheel support against the vehicle such that the vehicle suspension absorbs shocks; and
  II. an upper position wherein said first railway wheel is completely above a lowest point of the road wheels and said first contact point of said wheel support is withdrawn from contact with the vehicle; and
further comprising an actuating arm pivotably connected at one end to said mount frame and pivotably connected at another end to said wheel support and wherein said actuator causes said actuating arm to pivot such that said actuating arm moves said wheel support between said lower position and said upper position; and further comprising a cross-member, a cross-member arm, a first link, and a second link, said first link having one end pivotably connected to said mount frame and another end pivotably connected to said second link, said second link further pivotably connected to said cross-member arm, said cross-member rotatably connected to said mount frame, said actuating arm and said cross-member arm fixed to said cross-member and pivotably relative to said mount frame by rotation of said cross-member, said actuator operable to move said wheel support by moving said first and second links such that said second link moves said actuating arm by way of said cross-member arm and said cross-member.

16. A rail engagement apparatus for a road vehicle having a vehicle axle with road wheels and a vehicle suspension comprising:
a mount frame adapted to be mounted to the road vehicle; a wheel support having a first railway wheel rotatable mounted thereon, said wheel support movably connected to said mount frame; and
an actuator connected to said wheel support and operable to move said wheel support relative to said mount frame between:
  I. a lower position in which said first railway wheel extends lower than the road wheels to engage a rail with said wheel support transferring load to the vehicle suspension by way of a first contact point of said wheel support against the vehicle such that the vehicle suspension absorbs shocks; and
  II. an upper position wherein said first railway wheel is completely above a lowest point of the road wheels and said first contact point of said wheel support is withdrawn from contact with the vehicle, and
wherein, when said wheel support is in its upper position, said first railway wheel is completely between the vehicle suspension and a pivot axis about which said wheel support pivots as it moves between its lower and upper positions.

17. The apparatus of claim 16 wherein said apparatus with said wheel support in its upper position is completely sprung weight relative to the vehicle suspension.

18. The apparatus of claim 16 wherein said mount frame is adapted to be mounted on a front of the road vehicle.

19. A rail engagement apparatus for a road vehicle having a vehicle axle with road wheels and a vehicle suspension comprising:
a mount frame adapted to be mounted to the road vehicle; a wheel support having a first railway wheel rotatable mounted thereon, said wheel support movably connected to said mount frame; and
an actuator connected to said wheel support and operable to move said wheel support relative to said mount frame between:
  I. a lower position in which said first railway wheel extends lower than the road wheels to engage a rail with said wheel support transferring load to the vehicle suspension by way of a first contact point of said wheel support against the vehicle such that the vehicle suspension absorbs shocks; and
  II. an upper position wherein aid first railway wheel is completely above a lowest point of the road wheels and said first contact point of said wheel support is withdrawn from contact with the vehicle; and
wherein said wheel support has a second railway wheel mounted thereon and wherein said second railway wheel extends lower than the road wheels when said wheel support is in said lower position and said second railway wheel is completely above a lowest point of the road wheels when said wheel support in said upper position; and wherein said wheel support includes a railway axle extending between said first railway wheel and said second railway wheel; and wherein said wheel support includes first and second wheel arms adjacent opposite ends of said railway axle and said first contact point is adjacent a wheel end of said first wheel arm, and said second wheel arm transfers load to the vehicle suspension by way of a second contact point adjacent a wheel end of said second wheel arm, said second contact point contacting said vehicle when said wheel support is in said lower position and said second contact point is withdrawn from contact with the vehicle when said wheel support is in said upper position; and wherein said actuator moves said wheel support in a vehicle lengthwise direction when moving said wheel support between said lower position and said upper position; and further comprising an actuating arm pivotably connected at one end to said mount frame and pivotably connected at another end to said wheel support and wherein said actuator causes said actuating arm to pivot such that said actuating arm moves said wheel support between said lower position and said upper position; and further comprising a cross-member, a cross-member arm, a first link, and a second link, said first link having one end pivotably connected to said second link, said second link further pivotably connected to said cross-member arm, and cross-member rotatably connected to said mount frame, said actuating arm and said cross-member arm fixed to said cross-member and pivotable relative to said mount frame by rotation of said cross-member, said actuator operable to move said wheel support by moving said first and second links such that said second link moves said actuating arm by way of said cross-member arm and said cross-member.

20. The apparatus of claim 19 further comprising a flexible link having a first end attached to said wheel support and operable to prevent said wheel support from catching on lower obstructions.

* * * * *

UNITED STATES PATENT AND TRADEMARK OFFICE
CERTIFICATE OF CORRECTION

PATENT NO. : 5,154,124
DATED : October 13, 1992
INVENTOR(S) : Harry MADISON

It is certified that error appears in the above-identified patent and that said Letters Patent is hereby corrected as shown below:

On the title page: Item [54] and Column 1, line 1
change "SUPENSION" to -- SUSPENSION --;

Column 9, line 50, (Claim 15), change "pivotably" to -- pivotable --;

Column 10, line 38, (Claim 19), change "aid" to -- said --;

Column 11, line 8, (Claim 19), after "said" insert -- mount frame and another end pivotably connected to said --;

Column 11, line 10, (Claim 19), change "and" to -- said --.

Signed and Sealed this

Fourteenth Day of September, 1993

Attest:

BRUCE LEHMAN

*Attesting Officer*

*Commissioner of Patents and Trademarks*